United States Patent [19]

Ariga et al.

[11] 4,351,920
[45] Sep. 28, 1982

[54] THERMOPLASTIC RESIN COMPOSITION

[75] Inventors: Nagao Ariga; Kyotaro Shimazu; Hidenori Takenaka, all of Chiba; Hiroyuki Sato, Yachiyo, all of Japan

[73] Assignee: Dainippon Ink & Chemicals, Inc., Tokyo, Japan

[21] Appl. No.: 259,434

[22] Filed: May 1, 1981

[51] Int. Cl.³ .................... C08L 51/04; C08L 69/00
[52] U.S. Cl. ........................................ 525/67; 525/68; 525/69; 525/285; 525/468
[58] Field of Search ................. 525/67, 68, 69, 468

[56] References Cited

U.S. PATENT DOCUMENTS 3,966,842  6/1976  Ludwig .............................. 525/152

Primary Examiner—J. Ziegler
Attorney, Agent, or Firm—Sherman & Shalloway

[57] ABSTRACT

A thermoplastic resin composition comprising (a) 5 to 40% by weight of a rubber-modified styrene/maleic anhydride copolymer resin and (b) 95 to 60% by weight of a polycarbonate resin as main components.

12 Claims, No Drawings

THERMOPLASTIC RESIN COMPOSITION

This invention relates to a thermoplastic resin composition having much improved moldability and mechanical properties over a polycarbonate resin while retaining the inherent thermal stability of the polycarbonate resin. More specifically, this invention pertains to a thermoplastic resin composition comprising specified proportions of a polycarbonate resin and a rubber-modified styrene/maleic anhydride copolymer resin.

The rubber-modified styrene/maleic anhydride copolymer resin has superior thermal stability and good moldability, and therefore is widely used, and expected to be used, in various applications, for example in automobiles, household electrical appliances, precision instruments, business machines and medical instruments.

The polycarbonate resin, on the other hand, has high impact strength and superior thermal stability, but because of its too high a melt viscosity, its moldability is poor. Moreover, its high impact strength extremely decreases as the thickness of a specimen of the resin is increased. For example, while the polycarbonate resin has an Izod impact strength, measured in accordance with ASTM D-256, of about 50 to about 100 kg-cm/cm with a ⅛ inch bar, the Izod impact strength of a ¼ inch bar is only 8 to 15 kg-cm/cm.

In order to improve the moldability of the polycarbonate resin, it was suggested, for example, to incorporate a polybutadiene-type graft resin in the polycarbonate resin as described in Japanese Patent Publication No. 11496/1967, or to incorporate asphaltene in the polycarbonate resin as described in Japanese Patent Publication No. 38655/1975. By these methods, however, the problem of reduced impact strength cannot be entirely solved.

It is an object of this invention therefore to provide a polycarbonate resin composition having superior moldability and excellent impact strength particularly at increased thicknesses, without sacrificing the inherent superior thermal stability of the polycarbonate resin.

We have now found that this object can be achieved by a polycarbonate resin composition obtained by mixing specified proportions of the polycarbonate resin and a rubber-modified styrene/maleic anhydride copolymer resin.

Thus, according to this invention, there is provided a thermoplastic resin composition comprising (a) 5 to 40% by weight of a rubber-modified styrene/maleic anhydride copolymer resin and (b) 95 to 60% by weight of a polycarbonate resin.

The resin composition of the invention not only has equivalent thermal stability to the polycarbonate resin, but also exhibits excellent moldability represented by the fact that it requires a molding temperature at least 20° C. lower than the polycarbonate resin and a molding pressure at least 200 kg/cm² lower than the polycarbonate resin. It is surprising, too, that while the rubber-modified styrene/maleic anhydride copolymer resin and the polycarbonate resin usually have an Izod impact strength of 5.5 and 8.9 kg-cm/cm, respectively, the resin composition of this invention has an Izod impact strength of at least 20 kg-cm/cm.

The rubber-modified styrene/maleic anhydride copolymer (a) denotes a resin which is obtained by thermally polymerizing a rubber component, a styrene monomer and maleic anhydride in the presence of a chain transfer agent and a radical generator. The thermal polymerization is carried out, for example, by heating a mixture of styrene monomer and maleic anhydride monomer in a mole ratio of from 1.4 to 49, preferably from 4.6 to 17.0, the rubber component, a known radical generator and a known chain transfer agent in a ketone solvent such as acetone and methyl isobutyl ketone at a temperature of 60° to 180° C., preferably 75° to 140° C. After the thermal polymerization, a poor solvent such as petroleum benzin and methanol is added to the reaction product to precipitate the desired rubber-modified styrene/maleic anhydride copolymer resin (a). The precipitated copolymer resin (a) is used in the form of a powder, or in the form of pellets or granules.

Typical examples of the rubber components are butadiene rubber, butadiene/styrene rubber or butadiene-acrylic rubber containing 60 to 95% by weight of butadiene, isoprene rubber, isoprene/styrene rubber or isoprene/acrylic rubber containing 60 to 95% by weight of isoprene, A-B type block rubber or A-B-A type block rubber of butadiene/styrene containing 60 to 95% by weight of butadiene, and ethylene/propylene copolymer rubber (EPT). These components may be used singly or as a mixture of two or more. The rubber component is preferably contained in the finally obtained rubber-modified copolymer resin (a) in an amount of 2 to 25% by weight, especially about 5 to 12% by weight.

The rubber-modified styrene/maleic anhydride copolymer resin (a) is suitably such that the styrene/maleic anhydride copolymer portion left after removal of the grafted rubber polymer has an average molecular weight (Mw) (measured by gel permeation chromatography, i.e., GPC based on a polystyrene standard method) is preferably 100,000 to 400,000, especially preferably 150,000 to 300,000.

The rubber polymer suitably has a glass transition temperature (Tg), measured by an authorized method of differential scanning calorimetry, of preferably not more than 0° C., especially preferably −30° C. to −100° C., or suitably has an inherent viscosity, measured for a solution of 0.3 g of the rubber polymer in 1 deciliter of toluene, of preferably 0.9 to 2.5 dl/g, especially preferably 0.9 to 1.7 dl/g.

Typical examples of the polycarbonate resin (b) are those obtained by the reaction of aromatic dihydroxy compounds with phosgene, and those obtained by the reaction of aromatic dihydroxy compounds with carbonate precursors such as diaryl carbonates.

The aromatic dihydroxy compounds denote dihydroxy compounds having an aromatic group such as phenylene, biphenylene, naphthylene and anthrylene. Among them, bis(hydroxyaryl)alkanes are preferred. Typical examples of the bis(hydroxyaryl)alkanes are 2,2-bis(4-hydroxyphenyl)propane (commonly called bisphenol A), bis(4-hydroxyphenyl)methane (commonly called bisphenol F), 1,1-bis(4-hydroxyphenyl)ethane, 2,2bis(4-hydroxy-3,5-dibromophenyl)propane, 2,2-bis(4-hydroxy-3,5-dichlorophenyl)propane and various isomers thereof. These bis(hydroxyaryl)alkanes may be used singly or as a mixture of two or more. Suitable carbonate precursors are diaryl carbonates. Typical examples of the diaryl carbonates are diphenylene carbonate, di(biphenylene)carbonate, dinaphthylene carbonate and dianthrylene carbonate. They may be used either singly or as a mixture of two or more.

Roughly, there are two methods of preparation of the polycarbonate resin (b). One is called the "phosgene method" which comprises reacting diols with carbonyl halides such as phosgene, and the other is called the "ester method" or "ester interchange method" which comprises first preparing a carbonate precursor such as a diaryl carbonate, and reacting the precursor with a diol. Specifically, the polycarbonate resin (b) can be prepared by reacting an aromatic dihydroxy compound of the type examplified hereinabove with phosgene or the aforesaid diaryl carbonate in an organic solution containing a base such as pyridine, or by the method described in U.S. Pat. No. 3,028,365.

The polycarbonate resin (b) suitably has a viscosity average molecular weight (Mv) of preferably 10,000 to 70,000, more preferably 20,000 to 40,000, most preferably 25,000 to 35,000. The vicosity average molecular weight (Mv) is determined by measuring the intrinsic viscosity $[\eta]$ of a solution of the resin in methylene chloride using an Ostwald viscometer, and calculating the viscosity average molecular weight from $[\eta] = 1.23 \times 10^{-5} \text{Mv}^{0.83}$ expressing the relation between $[\eta]$ and $[\text{Mv}]$ which is described in "Angewandte Chemie," vol. 68, pp. 633–640 (1956).

The composition of this invention can be prepared by blending 5 to 40% by weight of the rubber-modified styrene/maleic anhydride copolymer resin (a) and 95 to 60% by weight of the polycarbonate resin (b) as main components by a known conventional blending method, namely by blending pellets with each or pellets with a powder in the heat-molten state using a roll, a Banbury mixer or an extruder.

If the ratio of the resin (a) to the resin (b) is less than 5:95 and the amount of the resin (a) is thus too small, the moldability and impact strength of the polycarbonate resin (b) cannot be improved. If this ratio exceeds 40:60 and the amount of the resin (a) is too large, the impact strength of the polycarbonate resin (b) is drastically reduced. The suitable ratio of the resin (a) to the resin (b) is preferably from 10:90 to 30:70, more preferably 15:85 to 25:75.

In blending these resins, a dry blend of the pellets of the two obtained without heat melting may be directly molded by an injection molding machine. In such an embodiment, too, the resin composition of this invention shows substantially equivalent properties to a resin composition obtained by heat melting as described above.

If desired, before blending, an antioxidant, an antistatic agent, an ultraviolet absorber, a coloring agent, an inorganic filler, a plasticizer, etc. may be added.

The resulting resin composition has a glass transition temperature at least 2° C. higher than the rubber-modified styrene/maleic anhydride copolymer resin (a) as its component, and as stated hereinabove, has far better moldability and impact strength.

The following Examples illustrate the present invention more specifically.

EXAMPLE 1

One hundred grams of a rubber-modified styrene/maleic anhydride copolymer resin (rubber components content 10% by weight) obtained by thermally polymerizing a mixture of styrene and maleic anhydride in a molar ratio of 9.7:1 in a customary manner in the presence of "DIENE NF35A" (a tradename for a butadiene rubber made by Asahi Chemical Co., Ltd.) was blended with 700 g of Iupilon S-2000 (a bisphenol A-type polycarbonate resin made by Mitsubishi Gas Chemical Co., Ltd.; glass transition temperature 147.5° C.), and the blend was then pelletized by an extruder (a hot cut-type extruder with a nozzle diameter of 26 mm, made by Sanjo Seiki Co., Ltd.).

The resulting pellets were molded by an injection molding machine at a cylinder temperature of 230° C. ($C_1$) and 250° C. ($C_2$) and a nozzle temperature of 240° C. to prepare test specimens.

The properties of the test specimens were measured, and the results are shown in Table 1.

EXAMPLE 2

Two hundred grams of the same rubber-modified styrene/maleic anhydride copolymer (rubber component content 10% by weight) as used in Example 1 was blended with 800 g of Iupilon S-2000, and the mixture was pelletized in the same way as in Example 1.

Using the resulting pellets, injection molded articles having the properties shown in Table 1 were produced in the same way as in Example 1 except that the cylinder temperature were changed to 250° C. ($C_1$) and 260° C. ($C_2$), and the nozzle temperature, to 260° C.

EXAMPLE 3

Injection molded articles were prepared in the same way as in Example 2 except that as the rubber-modified styrene/maleic anhydride copolymer resin, there was used a copolymer having a rubber content of 8% by weight obtained to thermally polymerizing in a customary manner a mixture of styrene monomer and maleic anhydride in a mole ratio of 6.0:1 in the presence of "TUFDENE 2000A" (a tradename for a copolymer rubber consisting of 75 parts by weight of butadiene and 25 parts by weight of styrene made by Asahi Chemical Co., Ltd.). The molded articles had the properties shown in Table 1.

EXAMPLE 4

Two hundred grams of a rubber-modified styrene/maleic anhydride copolymer resin having a rubber content of 8% by weight obtained in the same way as in Example 3 was blended with 800 g of "Teijin Panlite L-1250" (a bisphenol A-type polycarbonate resin made by Teijin Chemical Co., Ltd.; glass transition temperature 149.0° C.) in the same way as in Example 1.

The resulting pellets were molded in an injection molding machine at a cylinder temperature of 250° C. ($C_1$) and 260° C. ($C_2$) and a nozzle temperature of 260° C. to form test specimens.

The properties of the test specimens were measured, and the results are shown in Table 1.

EXAMPLE 5

Two hundred grams of the same rubber-modified styrene/maleic anhydride copolymer resin as used in Example 3 in pellet form was blended with 800 g of "Teijin Panlite L-1250" in pellet form, and the pellet mixture was molded by an injection molding machine at a cylinder temperature of 250° C. ($C_1$) and 260° C. ($C_2$) and a nozzle temperature of 260° C. to form test specimens.

The properties of the test specimens are shown in Table 1.

EXAMPLE 6

One hundred-and-fifty grams of a rubber-modified styrene/maleic anhydride copolymer resin having a rubber component content of 8% by weight and obtained by thermally polymerizing a mixture of styrene monomer and maleic anhydride in a mole ratio of 6.0:1 in the presence of "DIENE NF35A" in a customary manner was blended with 850 g of Teijin Panlite L-1250. The blend was worked up in the same way as in Example 5 to give injection molded articles having the properties shown in Table 1.

EXAMPLE 7

One hundred grams of Dylark No. 250 (a tradename for a rubber-modified styrene/maleic anhydride copolymer resin made by Arco Polymers, Inc., U.S.A.; rubber component content 15.4% by weight) in pellet form was mixed with 900 g of Iupilon S-2000 in pellet form. The pellet mixture was pelletized by using an extruder. Then, the pellets were molded by an injection molding machine at a cylinder temperature of 250° C. ($C_1$) and 260° C. ($C_2$) and a nozzle temperature of 260° C. to produce test specimens.

The properties of the test specimens are shown in Table 1.

COMPARATIVE EXAMPLE 1

Iupilon S-2000 was molded by an injection molding machine at a cylinder temperature of 260° C. ($C_1$ and $C_2$) and a nozzle temperature of 260° C. to prepare test specimens.

The properties of the test specimens are shown in Table 1.

COMPARATIVE EXAMPLE 2

A styrene/maleic anhydride copolymer resin having a rubber component content of 10% by weight obtained by thermally polymerizing a mixture of styrene monomer and maleic anhydride in a mole ratio of 9.7:1 in the presence of "DIENE NF35A" in a customary manner was molded by an injection molding machine at a cylinder temperature of 210° C. ($C_1$) and 230° C. ($C_2$) and a nozzle temperature of 220° C. to prepare test specimens.

The properties of the test specimens are shown in Table 1.

COMPARATIVE EXAMPLE 3

Five hundred grams of a styrene/maleic anhydride copolymer resin having a rubber component content of 8% by weight and obtained by thermally polymerizing a mixture of styrene monomer and maleic anhydride in a mole ratio of 6.0:1 in the presence of "TUFDENE 2000A" in a customary manner in pellet form was blended with 500 g Iupilon S-2000 in pellet form and the pellet mixture was pelletized in an extruder.

The pellets were then molded by an injection molding machine at a cylinder temperature of 230° C. ($C_1$) and 250° C. ($C_2$) and a nozzle temperature of 240° C. to prepare test specimens.

The properties of the test specimens are shown in Table 1.

COMPARATIVE EXAMPLE 4

Seven hundred grams of "Dylark No. 250" in pellet form was mixed with 300 g of Iupilon S-2000 in pellet form, and the pellet mixture was pelletized in an extruder.

Then, the pellets were molded by an injection molding machine at a cylinder temperature of 210° C. ($C_1$) and 230° C. ($C_2$) and a nozzle temperature of 220° C. to prepare test specimens.

The properties of the test specimens are shown in Table 1.

COMPARATIVE EXAMPLE 5

Three hundred grams of "Dylark No. 232" (a tradename for a styrene/maleic anhydride copolymer resin made by Arco Polymers, Inc. U.S.A.) in pellet form was mixed with 700 g of Iupilon S-2000 in pellet form. The pellet mixture was pelletized in an extruder.

The pellets were then injection molded by an injection molding machine at a cylinder temperature of 230° C. ($C_1$) and 250° C. ($C_2$) and a nozzle temperature of 240° C. to prepare test specimens.

The properties of the test specimens are shown in Table 1.

The various properties of the test specimens in the above Examples and Comparative Examples were measured by the following methods.

The "impact strength" is the Izod impact strength of a test specimen (a notched ¼ inch bar, ASTM D-256) obtained by an in-line screw type 1-ounce injection molding machine SAV-30A (made by Sanjo Seiki Co., Ltd.).

The "thermal stability" is measured by a Vicat softening temperature measuring instrument made by Shibayama Kagaku Seisakusho, Co., Ltd. using a test specimen prepared in the same way as above.

The "moldability" is an overall evaluation of injection pressure and releasability.

The above test items were evaluated on the following scale.

TABLE 1

| | Example | | | | | | | Comparative Example | | | | |
|---|---|---|---|---|---|---|---|---|---|---|---|---|
| | 1 | 2 | 3 | 4 | 5 | 6 | 7 | 1 | 2 | 3 | 4 | 5 |
| Impact strength | ◎ | ◎ | ◎ | ◎ | ◎ | ◎ | ○ | xx | xx | Δ | xx | xx |
| Thermal stability | ◎ | ◎ | ◎ | ◎ | ◎ | ◎ | ◎ | ◎ | xx | Δ | x | Δ |
| Moldability | ◎ | ◎ | ◎ | ◎ | ◎ | ○ | ○ | xx | ◎ | ○ | ◎ | Δ |

Standard of evaluation
◎: Excellent
○: Better
Δ: Good
x: Slightly inferior
xx: Inferior

What we claim is:

1. A thermoplastic resin composition comprising (a) 5 to 40% by weight of a rubber-modified styrene/maleic anhydride copolymer resin and (b) 95 to 60% by weight of a polycarbonate resin as main components.

2. The composition of claim 1 wherein said rubber-modified styrene/maleic anhydride copolymer resin (a) is prepared by reacting styrene monomer with maleic anhydride in the presence of a rubber component.

3. The composition of claim 1 wherein said polycarbonate resin (b) is obtained by reacting an aromatic dihydroxyl compound with phosgene or a diaryl carbonate.

4. The composition of claim 3 wherein said aromatic dihydroxy compound is a bis(hydroxyaryl)alkane.

5. The composition of claim 3 wherein said diaryl carbonate is a compound selected from the group consisting of diphenylene carbonate, di(bisphenylene)carbonate, dinaphthylene carbonate and dianthrylene carbonate.

6. The composition of claim 3 wherein said aromatic dihydroxy compound is 2,2-bis-(4-hydroxyphenyl)propane.

7. The composition of claim 3 wherein said aromatic dihydroxy compound is bis-(2-hydroxyphenyl)methane.

8. The composition of claim 3 wherein said aromatic dihydroxy compound is 1,1-bis(4-hydroxyphenyl)ethane.

9. The composition of claim 3 wherein said aromatic dihydroxy compound is 2,2-bis(4-hydroxy-3,5-dibromophenyl)-propane.

10. The composition of claim 3 wherein said aromatic dihydroxy compound is 2,2-bis(4-hydroxy-3,5-dichlorophenyl)-propane.

11. The composition of claim 1 wherein the weight ratio of the rubber-modified styrene/maleic anhydride copolymer resin (a) to the polycarbonate resin (b) is from 12. The composition of claim 1 wherein the weight ratio of the rubber-modified styrene/maleic anhydride copolymer resin (a) to the polycarbonate resin (b) is from 15:85 to 25:75.

* * * * *

UNITED STATES PATENT AND TRADEMARK OFFICE
CERTIFICATE OF CORRECTION

PATENT NO. : 4,351,920
DATED : September 28, 1982
INVENTOR(S) : Nagao Ariga et al.

It is certified that error appears in the above-identified patent and that said Letters Patent is hereby corrected as shown below:

Claim 11. The composition of claim 1 wherein the weight ratio of the rubber-modified styrene/maleic anhydride copolymer resin (a) to the polycarbonate resin (b) is from 10:90 to 30:70.

Signed and Sealed this

Twenty-third Day of November 1982

[SEAL]

Attest:

GERALD J. MOSSINGHOFF
Attesting Officer  Commissioner of Patents and Trademarks